UNITED STATES PATENT OFFICE.

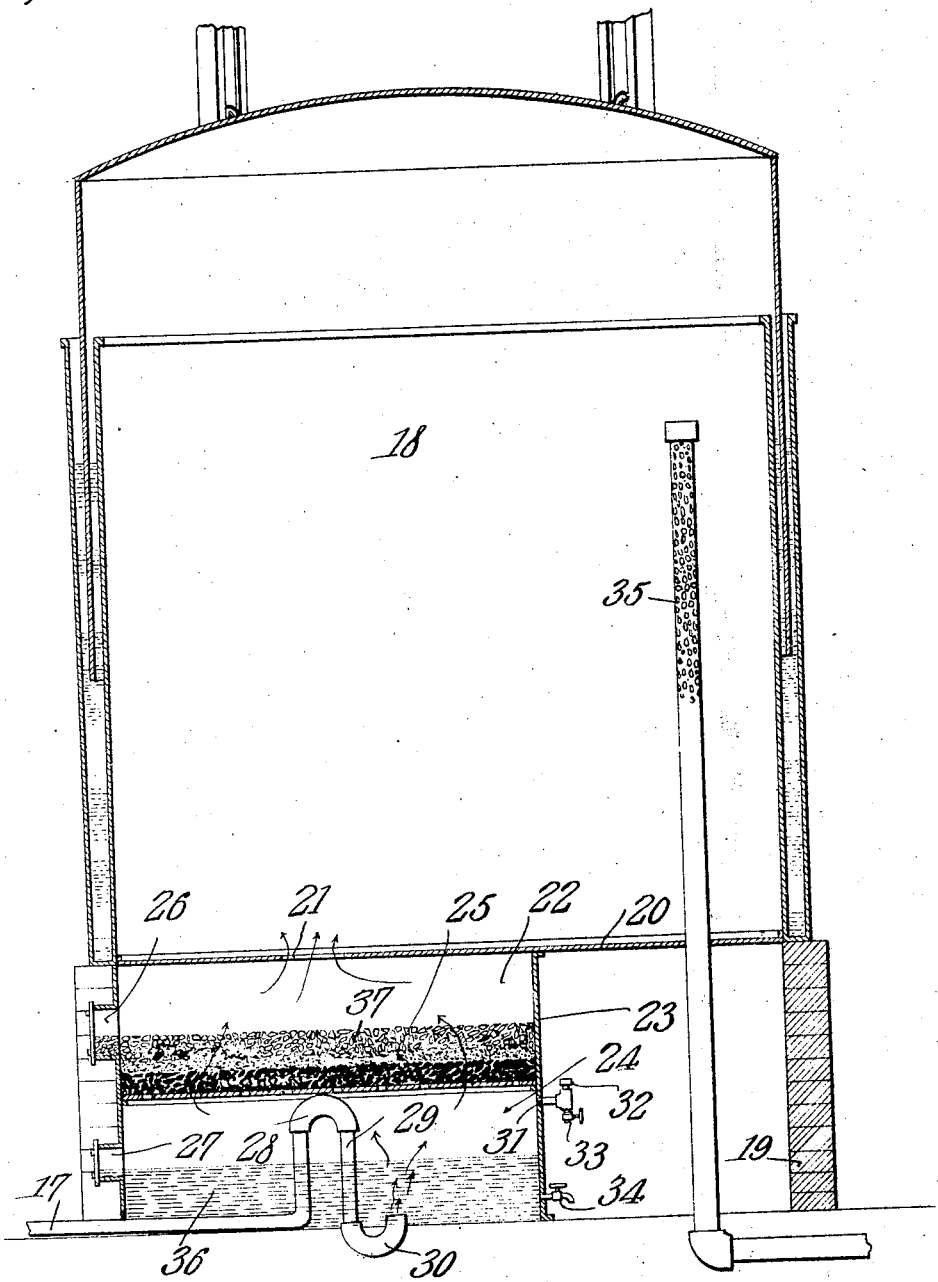

WILLIAM McARTHUR, OF TENINO, WASHINGTON.

APPARATUS FOR PURIFYING GAS.

933,097.

Specification of Letters Patent.    Patented Sept. 7, 1909.

Application filed January 15, 1909. Serial No. 472,517.

*To all whom it may concern:*

Be it known that I, WILLIAM MCARTHUR, a citizen of the United States, residing at Tenino, in the county of Thurston and State of Washington, have invented a new and useful Apparatus for Purifying Gas, of which the following is a specification.

This invention has reference to improvements in apparatus for manufacturing gas from lignite and relates more particularly to the means for purifying and storing the gas.

The object of the present invention is to provide a simple and efficient means for purifying the gas produced from lignite so that it may be immediately ready for use for illumination or heating.

The invention will be best understood from a consideration of the following detail description taken in connection with the accompanying drawing, forming a part of this specification, in which drawing there is shown a vertical section of a gas holder and the purifying means used in connection therewith.

Referring to the drawing, there is shown a gas holder 18 which may be of the ordinary water sealed type and need not in itself be particularly described. The gas holder is mounted upon foundation walls 19 and the bottom 20 of the gas holder is provided with a passage 21 communicating with a chamber 22 formed in a casing 23 housed within the foundation walls 19 below the bottom 20 of the gas holder. The chamber 22 is in the upper end of the casing 23 while another chamber 24 is formed in the lower part of the casing 23, the two chambers being separated by a perforated plate 25. Access to the chamber 22 is had through a manhole 26 and to the chamber 24 through a manhole 27. The pipe 17 enters the casing 23 and is then bent upward into a loop 28 having the crown near the bottom face of the partition or plate 25 while the end of the loop 28 remote from the pipe 17 is bent downward as shown at 29 and terminates in an upturned end 30 opening near the bottom of the chamber 24. Another pipe 31
enters the chamber 24 and this pipe is provided with a tee connection closed on one side by a cap 32 and on the other side by a valve 33. The chamber 24 is provided with a drain valve 34 near its lower end. Gas within the gas holder 18 enters a pipe 35 and is conveyed thereby to any suitable point of utilization.

Within the chamber 24 there is a quantity of lime indicated at 36 moistened with water until about the consistency of cream. Upon the plate or partition 25 there is produced a layer of coke and upon this a layer of sawdust and finally a layer of lime the entire mass being indicated at 37. These several layers are introduced into the chamber 22 through the manhole 26 while the liquid mass 36 of lime is introduced into the chamber 24 through the pipe 31, the cap 32 being removed for this purpose.

It is to be understood that the apparatus described is designed more particularly for use in the production of heating and illuminating gas from lignite and more especially the lignite found in the northwestern section of the United States.

The gases coming from a suitable producer pass by the pipe 17 to the outlet 30. The gases pass up through the liquid lime mass 36 into the chamber 24 and then through the perforated plate 25 and through the layers of coke, sawdust and lime into the chamber 22 and ultimately find their way through the opening 21 into the interior of the gas holder 18 where the purified gases are stored until they pass by the pipe 35 to the point of utilization.

What is claimed is:—

An apparatus for purifying gas containing lime in a semi-liquid state and beyond the same in the path of the gas having a support containing coke, sawdust, and lime.

In testimony that I claim the foregoing as my own, I have hereto affixed my signature in the presence of two witnesses.

WILLIAM McARTHUR.

Witnesses:
  H. P. SCHEEL,
  P. C. KIBBE.